Jan. 21, 1947.  C. F. GRAM  2,414,644
THREAD ADVANCING DEVICE
Filed Aug. 9, 1945  7 Sheets-Sheet 1
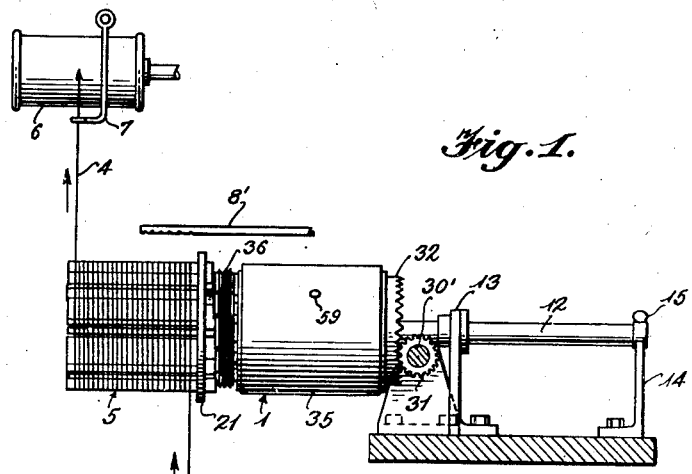
Fig. 1.
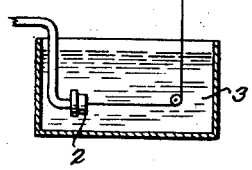
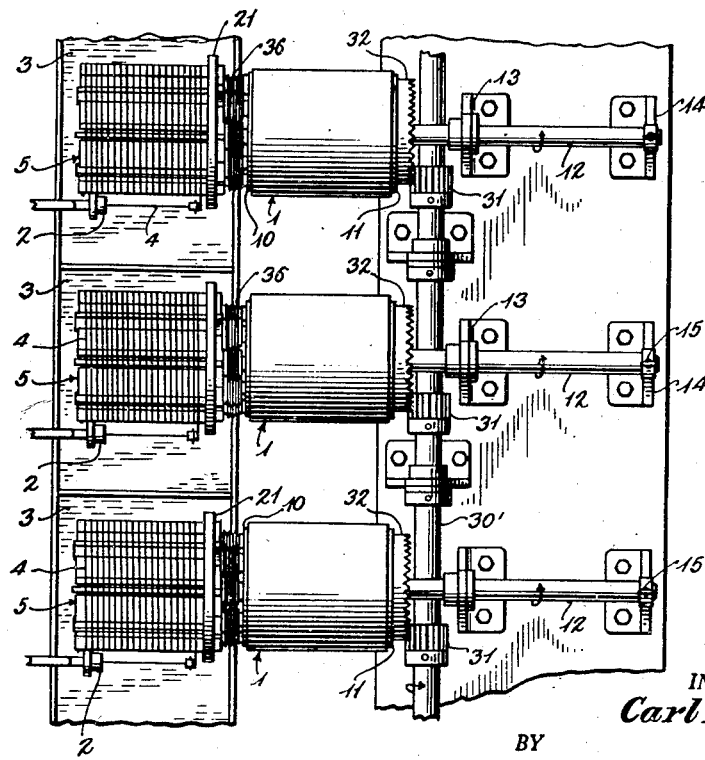
Fig. 2.
INVENTOR.
Carl F. Gram
BY
ATTORNEY Jan. 21, 1947.                C. F. GRAM                2,414,644
                        THREAD ADVANCING DEVICE
                         Filed Aug. 9, 1945           7 Sheets-Sheet 2
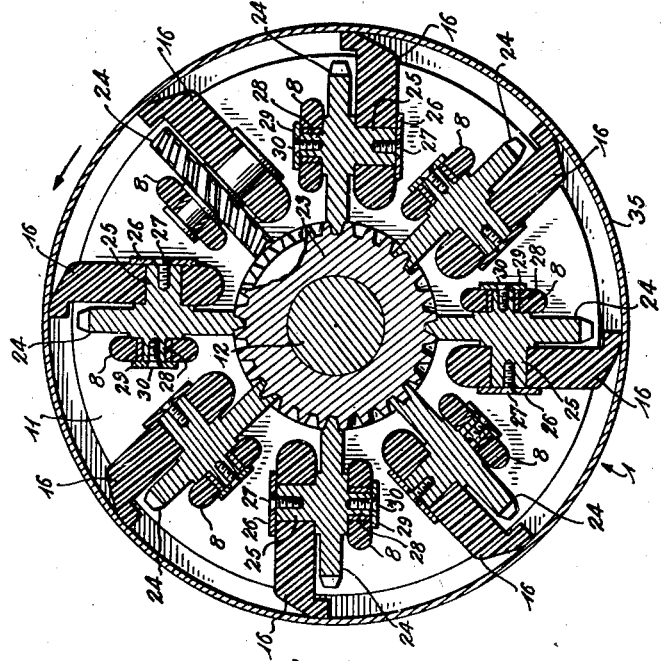
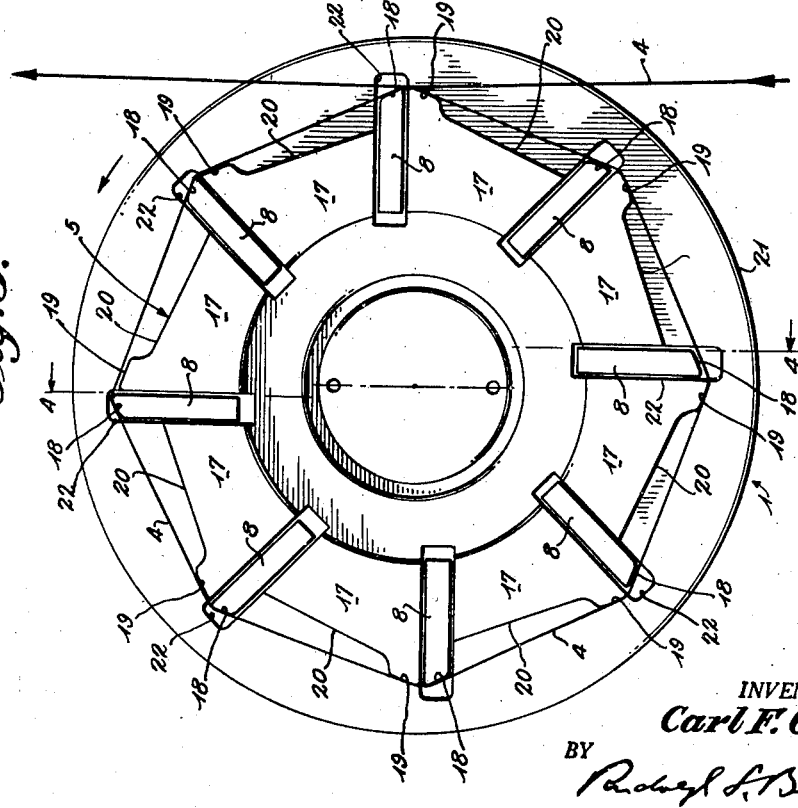
INVENTOR.
*Carl F. Gram*
BY
ATTORNEY Jan. 21, 1947. C. F. GRAM 2,414,644
THREAD ADVANCING DEVICE
Filed Aug. 9, 1945 7 Sheets-Sheet 3
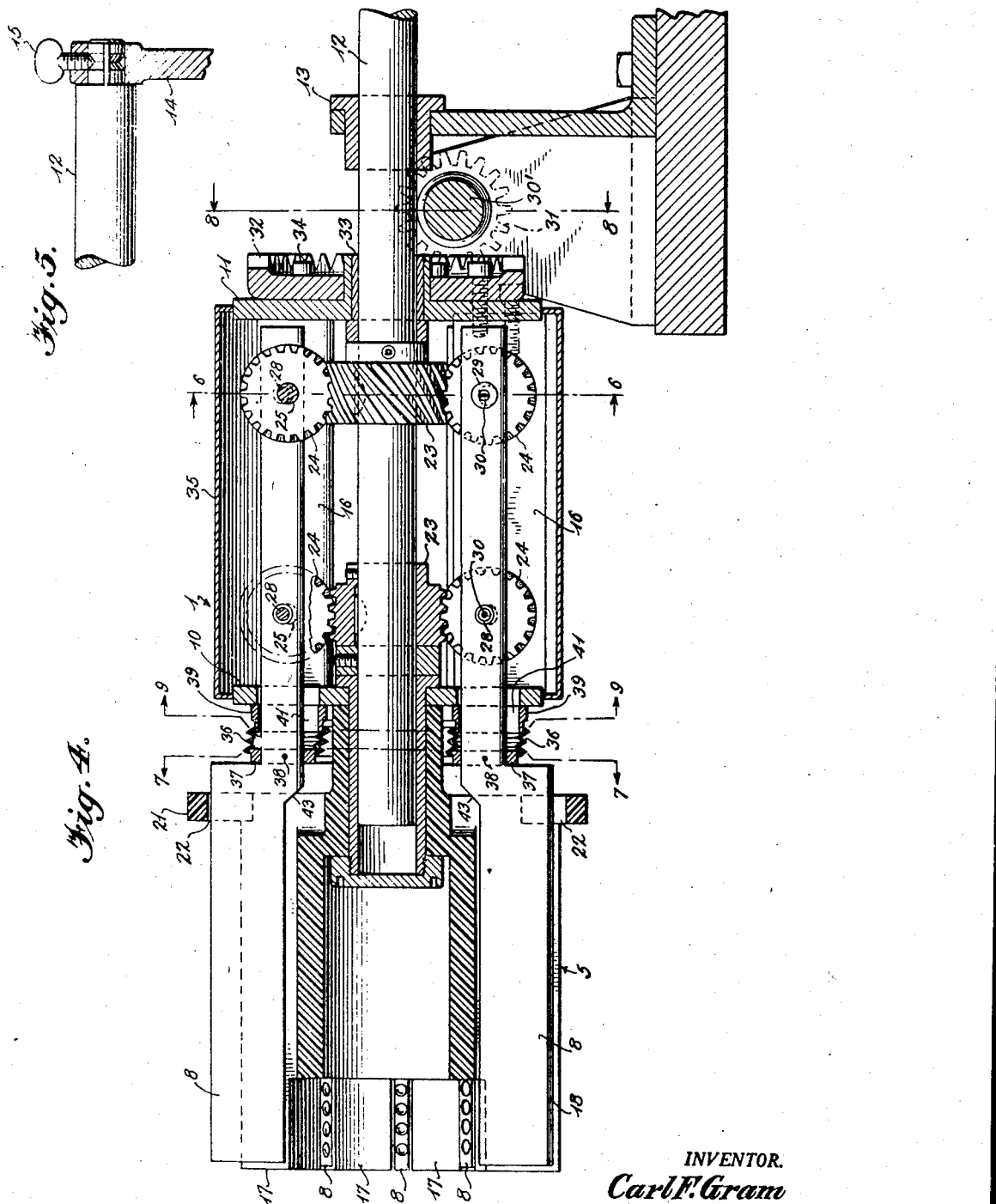
INVENTOR.
*Carl F. Gram*
BY
ATTORNEY Jan. 21, 1947.  C. F. GRAM  2,414,644
THREAD ADVANCING DEVICE
Filed Aug. 9, 1945  7 Sheets-Sheet 4

INVENTOR.
Carl F. Gram
BY
Rudolph P. Bley
ATTORNEY

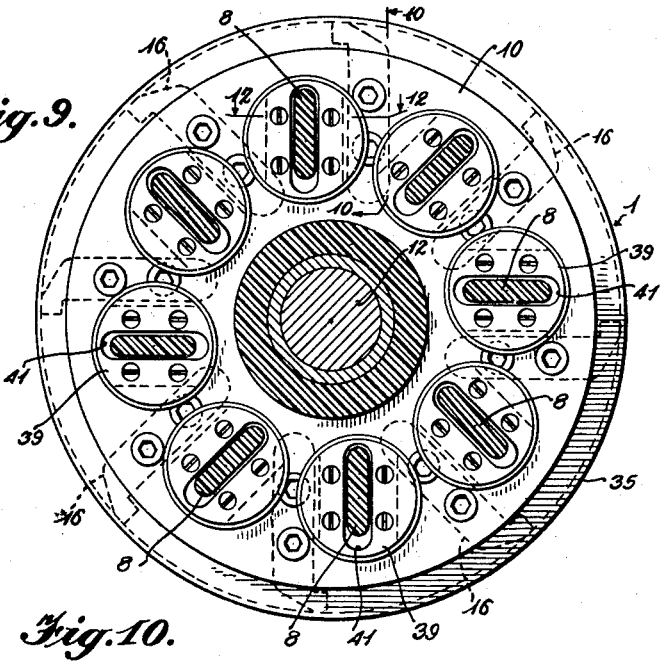
Fig. 9.
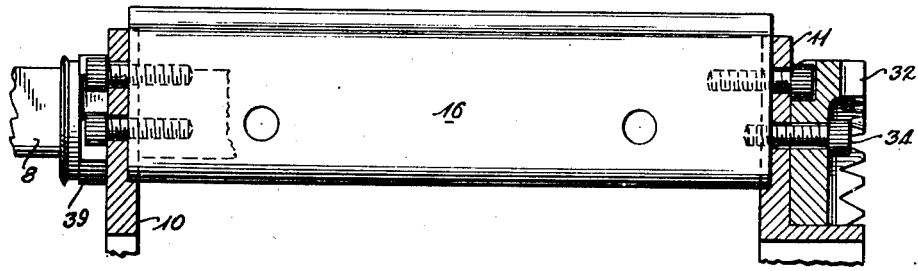
Fig. 10.
Fig. 11.
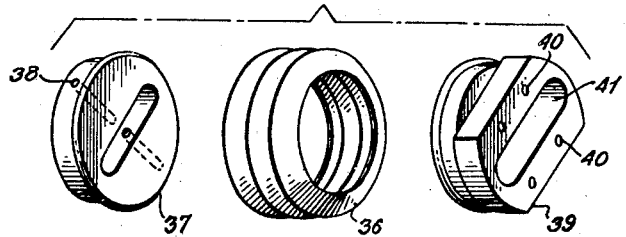
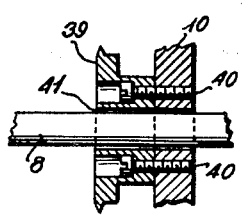
Fig. 12.
INVENTOR.
Carl F. Gram
BY
ATTORNEY

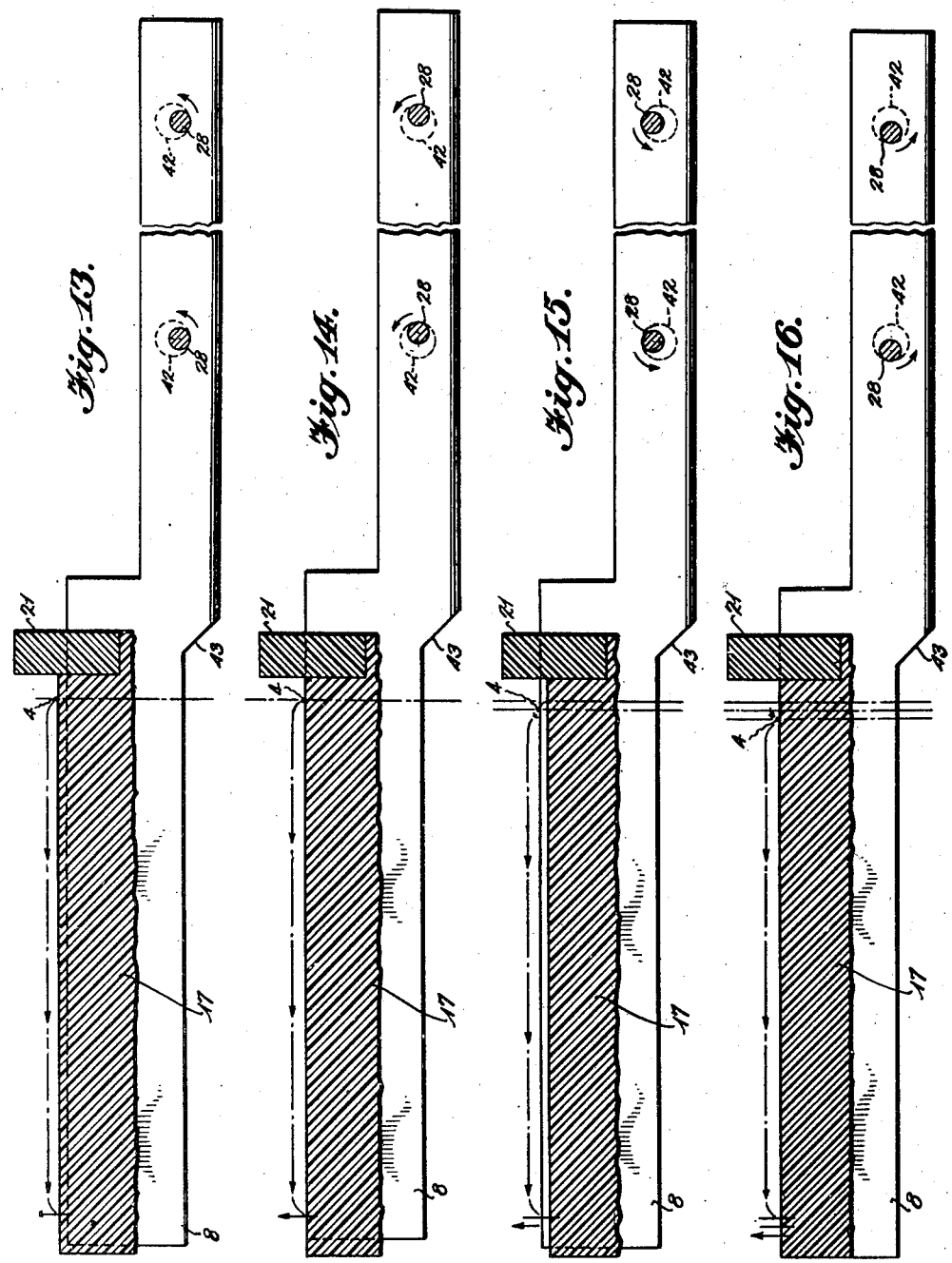

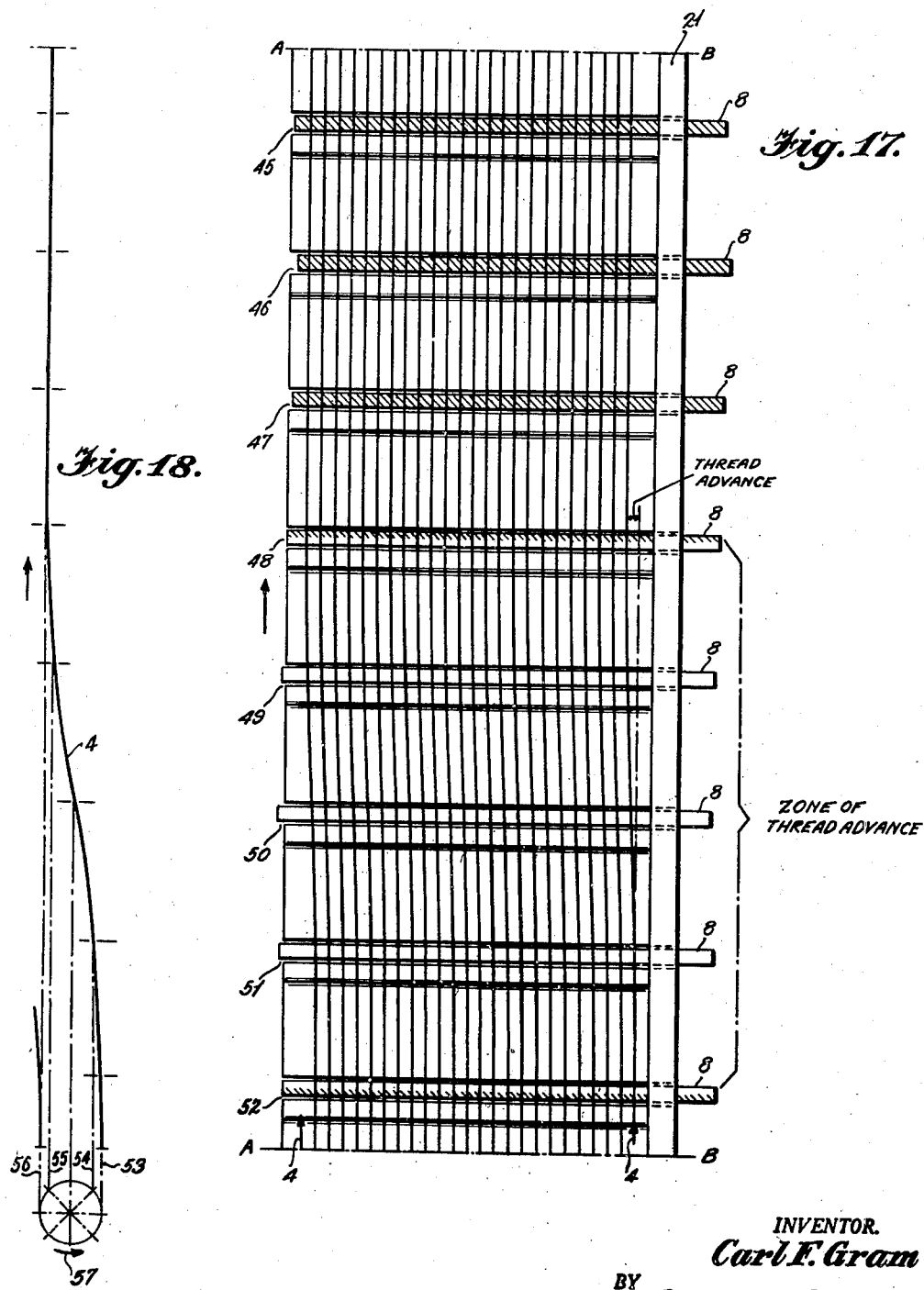

Patented Jan. 21, 1947

2,414,644

UNITED STATES PATENT OFFICE 2,414,644

THREAD ADVANCING DEVICE

Carl F. Gram, Rowayton, Conn., assignor to North American Rayon Corporation, New York, N. Y., a corporation of Delaware Application August 9, 1945, Serial No. 609,875

11 Claims. (Cl. 28—71.7)

This invention relates to apparatus for the continuous treatment of thread, more especially synthetically produced thread such as rayon or the like, as the same is advancing continuously from its point of creation to its storage in finished form, the apparatus in single or multiple unit form being interposed between the points of creation and storage for effecting a transient repose of the thread thereon in the form of helical turns so as to permit efficient application of the treatment.

The invention is especially suited for the liquid treatment procedures used in manufacturing synthetic thread such as viscose rayon by the so-called "continuous" method. In that method the thread, after being chemically created or formed, proceeds without interruption continuously to a point of storage where it is wound on spools, or other so-called "packages" in completely finished condition. Between the place where it is created, i. e. after issuing from the spinneret and emerging from the coagulating bath, and the point of storage, e. g. where it is wound up, it is usually treated with the various liquid agents used in the viscose rayon process. To effect such treatment efficiently it has been found desirable in the art to wrap the moving thread in the form of spaced helical convolutions on devices such as reels, cylinders, spools or the like and to apply the treating liquids to the convolutions of the thread while it is passing over such devices in the helically wrapped manner aforesaid. A plurality of such helical units may be interposed at suitable places between the points of creation and final storage and the thread passed from one to the other for repeated or different treatments. Such arrangements, used for transiently supporting the thread in helical form while it is advancing continuously and undergoing treatment, are known in the art as "thread-advancing, thread-storage devices." The term "advancing" is used to denote the operation of continuously forming the transient helical convolutions by the operative elements of the device and the term "storage" has come to mean the carrying of the convolutions by the device as the thread passes along, such "storage" constituting but a momentary or transient repose of any given portion of the thread on the device, whereas "storage in finished condition" means the gathering or winding of the finished thread on spools, cones, or the like in a state suitable for shipment.

Such devices, in addition to performing the function of acting as transient supports for the helical increments of the continuously progressing thread so as to permit efficient treatment thereof, also make it possible to reduce to a minimum the quantities of treating liquids used for that purpose, a factor of great importance in plants where large numbers of such devices are used.

Further desiderata of such a device are that it must not injure the thread, as by exerting sliding friction thereon, as it progresses thereover, but must nevertheless be able to advance it in helical formation without undue drag as rapidly as it is fed to the device. It should permit the thread helix to be varied as to the number of convolutions and the spacing of these with respect to each other; it should function so as to cause the helical thread unit, once formed, to maintain a relatively non-shifting bodily position thereon, e. g. with respect to the treating liquid supply devices or receptacles and so that none of the convolutions wander off at the end of the device and thus cause tangling, breakage, and interruption of the continuity of the thread, said continuity of thread, devoid of splices or knots, being the basis upon which the success of the continuous method is predicated. It should also be "self-threading" so as to obviate the necessity for wrapping the thread thereon manually.

It is an object of the present invention to provide a reel which meets the above recited requirements.

It is a further object of the invention to provide a thread-advancing, thread-storage device that is supported in cantilever fashion, that is, with the operative or driving mechanism disposed at one end and at a distance from the thread carrying portion and with said mechanism adapted to be easily lubricated as well as protected from the entry of thread treating liquids.

The invention also contemplates a unique arrangement of the thread supporting and advancing elements of the device as well as a unique means for imparting the appropriate movements to the same.

In considering the deficiencies of prior devices of the kind here involved, it is to be noted that previous to the advent of artificial silk, rayon, and the like, thread treating devices were proposed in which laterally movable slats carried on the periphery of a reel-like structure were jolted or "shogged" to and fro in proper sequence by means of cams or the like. The application of violent movements however has been found to be undesirable for advancing freshly created synthetic threads. Other proposed arrangements have involved the use of cylindrical cage-like reels composed of spaced end discs carrying horizontal bars near their periphery and extending horizontally between the discs with the bars of one disc passing in between the bars of the other and riding loosely in grooves on or near the periphery of the other disc, the axes of the respective discs being angularly disposed and offset to each other, thus causing the bars to slide laterally, rise up and down, and produce an eccentric motion adapted to advance the thread in helical fashion, (see for example: French Patent No. 824,415). Devices of this general type, as typified by this patent, give rise to serious problems among which may be mentioned inaccessibility of the thread helix as wrapped on the device and the cumbersome nature of the drive required.

The last-named device has also been embodied in cantilever form with both sets of bars protruding from the supported end so as to operate in so-called "interdigitating" relation, the two bar-carrying discs being also disposed at the supported end and associated in driving relation by suitable gears, cams, eccentrics or the like, the movement being essentially an eccentric wobbling of one set of circumferential bars in between another set of similar bars.

The device of the present invention is a thread-advancing, thread-storage device of this general class, but the operative elements, method of mounting the blades, and mode of operation thereof differ substantially from those of the prior art.

The general nature of the device of the present invention differs materially from the heretofore designed reels in that the thread-advancing elements are constituted as individual blades, mounted for individual movement to each of which a forwardly directed substantially straight line motion is imparted during the thread-carrying forward stroke thereof in such fashion as to cause the blade to move in a direction substantially parallel to the operating axis of the device, the receding or thread depositing motion of the blade being in a substantially vertical, inward, direction starting at the end of the thread-carrying stroke, and the return stroke of the blade, after the thread has been deposited, being exactly like the first except at a lower level and of course without any thread reposing thereon. Adjacent each blade is a thread-supporting member parallel therewith but stationary with respect thereto and upon which the thread is deposited by the blade as the latter recedes. The movements of the blades with respect to each other and with respect to these cooperating thread support members are so correlated with each other as to produce the advance and helically wrapped formation of the thread referred to without jolts, drag or undue friction, the means for producing such movements constituting an essential feature of the invention and being described in detail below, together with the theory underlying the operation of the mechanism used.

Another additional feature of the invention resides in so constituting the blade drive means as to shield it effectively from contact with treating liquids.

The device will now be described in detail, reference being directed to the accompanying drawings, wherein:

Figure 1 is a diagrammatic illustration of a synthetic thread spinning system in which a reel constituted in accordance with the present invention is incorporated;

Figure 2 is a plan view in which a plurality of thread treating devices constituted in accordance with this invention are illustrated along with means for driving the same;

Figure 3 is an end view of the reel illustrated in Figure 1, showing the thread carrying and treating portion;

Figure 4 is a longitudinal sectional view of the device, taken on line 4—4 of Figure 3;

Figure 5 is a sectional elevation of a detail of a support element;

Figure 6 is a cross-sectional view taken through the device at the line represented by 6—6, Figure 4;

Figure 9 is a sectional view on line 9—9 of Figure 4, illustrating the blades of the reel and the means used for preventing entry of treating liquid to the drive means;

Figure 10 is a section taken on line 10—10 of Figure 9, showing a detailed illustration of the blade support system;

Figure 11 is an exploded view of one of the sealing means used for preventing entry of treating liquid to the drive means;

Figure 12 is a detailed sectional view on line 12—12 of Figure 9, indicating the method in which the blade passes through the guide means;

Figure 8:
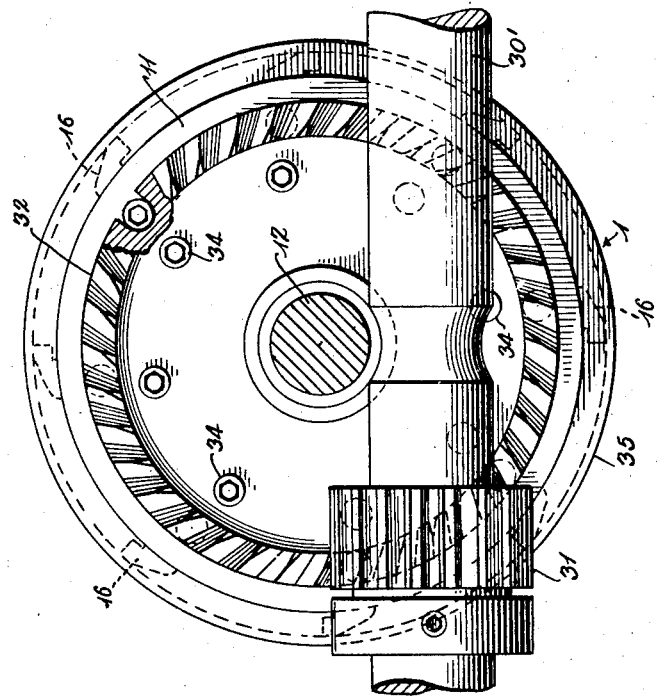
Figure 8 is an end view on line 8—8 of Figure 4, showing the means used for driving the device.

Figures 13 to 16, inclusive, illustrate four different positions assumed by the blades during a complete revolution of the reel;

Figure 17 is a plane projection of the device, showing the relative positions occupied by each blade at a given instant and showing the advance of the thread in a given cycle; and Figure 18 is a graphical representation of the movement of the thread in forming the helical convolutions, the movements being represented in somewhat amplified fashion for the sake of clearness and explanation.

Referring in detail to the drawings, the thread-advancing, thread-storage device, designated as a whole by the numeral 1 is illustrated in Figures 1 and 2 in a manner in which it is to be used. Viscose or other synthetic thread producing material, upon its extrusion from spinneret 2 passes into a coagulating bath 3, whereupon the thread 4 as thus formed is of sufficient strength to permit its progression to the point where it is to be treated, e. g. on the thread carrying portion of the device 1, here indicated by the numeral 5. The leading end of the thread 4, upon being applied, while wet, to the outer surface of the device while the latter is operating, immediately wraps itself thereon in the form of helical convolutions after which the end of the thread is passed to a storage device 6, here shown as a conventional spool, where the thread is wound thereon in continuous fashion, a suitable traverse guide 7 being provided as is customary in the art.

One or more treating liquid supply pipes, diagrammatically represented at 8' are provided in liquid delivering proximity adjacent the helically wrapped thread body reposing on the portion 5 of the thread-advancing, thread-storage device, and suitable liquid collecting means (not shown) may be provided beneath the portion 5. Alternatively, other means may be provided for supplying the treating liquid to the thread, such as trays or tanks in which a portion of the device may be immersed.

Figure 2 shows a top view of a number (e. g. three) of individual devices of the type illustrated in Figure 1, all driven by a common drive means, although obviously a separate drive means may be provided for each device. In the arrangement shown in Figure 2, the individual reels are supplied with thread from its own thread source, for example, respective spinnerets 2. Each reel is provided with its own treating liquid supply and collection means and thread gathering storage means (all of which are omitted to avoid encumbering the drawings). The number of units used may be varied as desired, and the units may be disposed in any suitably spaced manner, and horizontally or vertically staggered or in off-set or parallel relation to each other, adapted to facilitate access or economize in floor space. Alternatively, if desired, in Figure 2, although each device is shown provided with its own thread supplying spinneret, a number of such devices for subjecting a single thread to a plurality of successive or repetitive treatments may be used in which case the thread issuing from the spinneret associated with the first device is passed over said first device and thence over the second and third devices. In fact, additional devices on each of which the thread is subjected to specific treatment may be employed. This is of especial importance in the manufacture of viscose rayon, for example, where the compositions of the treating liquids differ greatly from each other and must be kept separate. The thread may also be dried on a unit of the type described, as by heating means suitably associated therewith.

The thread-advancing, thread-storage device and its operation will now be described in detail.

As hereinbefore stated in connection with Figures 1 and 2, the device is shown with the driving portion indicated generally by 1 and the actual thread supporting end by 5 for clearness. Actually, however, these portions are so associated as to constitute an operative unit.

Figure 7:
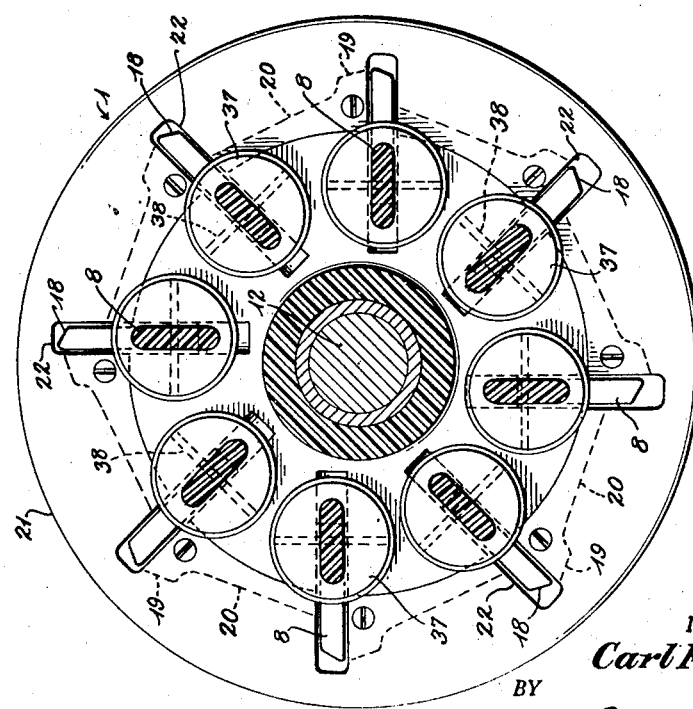
Figure 7 is a view similar to Figure 6, taken on line 7—7 of Figure 4, showing the means used for sealing the thread carrying section from the driving end.

Referring to Figures 3 to 9, inclusive, which show the operative mechanism of the device and parts thereof in section, it will be noted that the thread-advancing, thread-storage device comprises a suitable number of blades 8 made of non-corrodible metal or plastic material. In the embodiment used by way of example, eight blades are shown but this number is merely illustrative and a greater or lesser number may be used, depending on the number of thread convolutions desired, the diameter of the device, etc. The length of the blades at the thread-carrying end 5 of the device should be sufficient to permit the formation thereon of a helical thread unit of a size convenient for treatment. Their length at the driving end of the device depends on the size and separation of the gear units employed and the space available therein.

The blades 8 may be rectangular in shape but it has been found preferable to offset the front or thread-carrying end above the rear or drive receiving end for reasons hereinafter pointed out. These blades are mounted and operated in the following manner:

The blades 8 extend through guide grooves or slots in plate or guard 10 and into plate 11 (Figure 4). The plates 10 and 11 are rigidly mounted on a central stationary shaft 12 suitably supported as at 13 in a rigid member 14 and locked against rotation as at 15, thus constituting a reel supported in cantilever fashion. Within the driving portion of the reel 1 are a series of gear supporting members 16 to be hereinafter more fully described.

At their thread-carrying front portions the blades extend through a structure that includes rib-like members 17, hereinafter referred to as "ribs," formed of non-corrodible metal or preferably plastic material immune to treating liquids. These ribs, together with the blades constitute a structure somewhat resembling in appearance a cross-section of a reamer or honing device having inserted negative-rake scraping blades. By way of example of a preferred and convenient form of construction, it may comprise a central internal hub portion carried by plate 21, as hereinafter described, from which hub the ribs 17 extend outwardly in spaced relation to each other to provide passages or slots for housing and permitting free movement of the blades 8. Such structure may be constituted of assembled pieces or it may be cast or molded as an integral unit. The blades 8 have chamfered leading edges 18 sloping in the direction of rotation and the ribs 17 have trailing edges 19 extending backwards of the direction of rotation. Moreover, the top peripheral sides 20 of the ribs 17 also slope in the same general direction as their stepped-up trailing edges 19. The chamfered leading edges 18 of blades 8 and the sloping trailing edges 19 of ribs 17, in cooperation, constitute supports for the thread convolutions while at the same time they provide a minimum of blade surface contacting with the thread during the actual treatment, thus avoiding frictional damage to the thread while yet, through agency of the sloping tops of the blade and of the cooperating ribs facilitating retention of the thread when it is first applied thereto preparatory to automatically threading itself up on the device.

Plate 21 constitutes the boundary between the thread-carrying portion 5 of the device and the blade operating, supported end. A sealing system, hereinafter described in detail is disposed between the thread-carrying end and the mechanically driven end to prevent entry of treating liquid to the latter.

The drive system used to impart the thread advancing helix forming motion to the blades is comprised of the central shaft 12 which also supports the whole device in cantilever fashion. Shaft 12, as stated above, is stationary, and carries, keyed or otherwise fixed to it, a pair of helical pinions 23 as shown both in section and elevation in Figure 4. Meshing with these pinions and at right angles thereto are similar pinions 24 (Figures 4 and 6). These are carried on support members 16 suitably retained rigidly in place between the plates 10, 11. A preferred method of mounting the pinions 24 for the right-angle transmission of motion from the pinions 23 is to provide them at one side with stud shafts 25 journaled either directly in members 16 or in suitable bushings therein. To hold them rotatably in place suitable washers 26 and screws 27 are provided. At their other sides pinions 24 also carry stud shafts 28, but these shafts are eccentric with respect to shafts 25, as shown in Figure 6. These eccentric shafts 28 are journaled in the body of the blades or in suitable bushings therein, the assembly being held together by washers 29 and screws 30.

In a preferred embodiment of the invention, two pinions are disposed rigidly on the stationary shaft 12 and two pinions are provided on each support member 16 to mesh therewith at right angles. Each blade is therefore carried by the eccentric shafts of two pinions. More than two of such pinions may of course be used, for example, if very long blades are employed in which case extra pinions meshing therewith should be provided on shaft 12. There are as many pinion support members as there are blades and they are retained substantially radially between the plates 10 and 11. It is apparent that since the pinions 24 are concentrically journaled in support members 16 and the blades are journaled on the eccentric shafts 28 of the pinions, reciprocatory horizontal and vertical motions will be imparted to the blades when the pinions 24 rotate. Rotation of pinions 24 is effected by rotating the entire device bodily about stationary shaft 12 and the pinions fixed to it, thus causing the pinions 24 to travel circularly around the fixed pinions 23 and, since both are adapted for right angle drive engagement therewith, it is apparent that pinions 24 will be constrained to rotate as they travel around pinions 23, and thus effect movement of the blades. Driving of the entire system may be effective conveniently by the arrangement shown in Figures 1, 2, 4 and 8. A suitably driven shaft 30 disposed at right angles to stationary shaft 12 carries a pinion 31 which drives a suitable crown gear 32 attached to the end plate 11 as by screws 34, said end plate and said gear being suitably journaled for rotation on stationary shaft 12 as by bushing 33.

In Figure 2 a number of thread-advancing, thread-storage devices constituted in accordance with the invention are shown driven simultaneously from a single shaft 30. Alternatively, of course, individual drives may be used for each of the devices of such a multiple system or the ratio between the gears 31—32 may vary from unit to unit if desired whereby stretch may be imparted to the thread between units. The device is preferably provided with a housing 35 (Figure 4) adapted to hold lubricant for the gear drive therein, a suitable lubricant filling plug or other suitable means 59 (Figure 1) being provided on the housing.

In order to protect the drive system against entry of thread treating liquid thereto, a sealing system is associated with the blades at the place where they pass from the thread-carrying portion of the device to the drive end thereof. This system is shown generally in Figures 1, 2 and in detail in Figures 4, and 9 to 12, inclusive. It involves the use of flexible expansible and contractible members, for example bellows, made of metal or preferably of chemically and oil resistant synthetic rubber. Alternatively, closely interfitting metal sleeves suitably flexibly or resiliently bonded to the blade and plate 10 may be used. In the preferred embodiment, synthetic rubber bellows 36 (Figures 4 and 11) are used. A separate bellows or analogous sealing member is provided for each blade and is rigidly attached to the blade rearwardly of its emergence at the rear of plate 21 (Figure 4) and before the blade passes through plate 10 of the gear drive compartment 1. The bellows or other member may be integrally bonded with the blade at the aforesaid place as by vulcanization if the bellows is of rubber, or by integral metal bonding if of metal. For convenience in assembly it may be preferable to force a separate flange 37 (Figure 11) in liquid-proof fitting relation onto the blade and retain it thereon as by pin 38. A similar flange 39 may then be attached to the outside of plate 10 through agency of screws (not shown) passing through holes 40, but of course in this case permitting the blade to slide and move freely in the aperture 41 of the flange. The flexible member or bellows 36 extends between the flanges 37 and 39 as shown in Figure 4 and hence permits the blade to reciprocate horizontally and vertically without, however, permitting thread treating liquid from entering the gear drive compartment.

Referring now to the mode in which the blades are operated to produce the helical wrapping of the thread, it is to be noted that when the entire structure is driven by the crown gear 32 it rotates as a unit about the stationary shaft 12. The gears 24 travel around the cooperating stationary gears 23 and while doing so, rotate on their concentric shafts. The blades, being journaled on the eccentric shafts 28 on the opposite side of these gears, will of course reciprocate horizontally and vertically. The motion of each blade as recited in the introduction, involves a substantially horizontal component which, when directed toward the front or thread-carrying end serves to carry the thread forward. At such time the blade is in raised condition so that the thread is lifted from the edge 19 of the rib 17 (Figure 3). The ensuing movement, after the blade has reached its most forward position is in a substantially inward or thread-depositing manner during which the thread is laid upon the forward or leading edge 19 of rib 17. The blade, while its thread-carrying edge is below the thread-receiving edge of rib 17 moves back in the direction of the gear drive section of the device, then upwardly and again horizontally forward, and so on. The movement of the blade is analogous to that of the connecting rod extending between two driving wheels of a locomotive, where the rod in its horizontal reciprocatory movements always remains substantially parallel to the track. So in the present case the blade in its horizontal reciprocating movements always remains substantially parallel to the stationary shaft 12. This type of mechanical movement is known in mechanics as the "four-bar linkage" (see: "Elements of Mechanism" by Schwamb, Merrill & James; New York, Jno. Wiley & Sons, 1921, pp. 221–222). The gears 24 of any given pair represent two of the bars and the blade 8 and support member 16 the other bars of the linkage system in the present case.

Each blade of the thread-advancing, thread-storage device partakes of the same types of movement but the movements of the various blades are so related in phase to each other by properly setting the positions of the pairs of eccentric shafts 28 when assembling the device as to cause the thread to be lifted, carried forward, and deposited in such sequence as to produce the helical wrapped form desired, when the device is rotated. More specifically, it will be seen by referring to Figure 3 that blade 8 is housed below the surface 19 of rib 17 at a given instant and that upon a quarter rotation of the gears, the cam action produced results in elevating the blade to a position where it engages a section of each convolution of thread, prior to the movement of the thread along the reel. The subsequent quarter rotation of the gears will, due to the cam action produced, cause the blade to move further upwardly and forward, carrying with it respective sections of the thread convolutions, whereupon, as shown in Figure 16, the blade is retracted to a point where the sections of the thread convolutions are again deposited upon the surface 19 of rib 17, after which, during subsequent rotation of the gears, the blade is returned to its initial position where it is again ready for a repetition of the operation to move the respective sections of the thread convolutions another step forward. Each of the blades partakes of the same movement, but while one blade is moving forward, the diametrically opposite blade is returning to its original position.

Although each blade is individually driven, the entire blade system may be considered as a unit in analytically evaluating the motion thereof as a whole with the concentric rotation of the slotted structure comprising the rib members 17. The device is therefore a reel adapted for the transient repose thereon of a helix of thread that is continuously fed thereto adjacent one end and continuously delivered therefrom at the other end. The incremental lifting and advance of the thread by the reel which causes the formation of the helix results from the fact that the structure comprises two members rotating about parallel but spaced axes. The axis of the structure comprising the ribs 17 is obviously concentric, e. g. with shaft 12. The axis of the blade structure, considered as a whole, may be regarded as a theoretical entity, difficult to visualize, due to the fact that the eccentric mounting of the blades and their operation in thread lifting and advance effecting phase relation somewhat obscures perception of location of the actual axis of the blade structure unit.

Four representative positions assumed by one of the blades 8 are depicted in Figures 13 to 16 where the eccentric shafts are indicated by 28 and the eccentric path (in the directions of the arrows) by the dotted line circles 42. These figures also show the offset construction between the front and rear portions of the blade (indicated at 43) referred to previously. While the blade may be rectangular, an offset construction is preferred inasmuch as it not only economizes in blade material but the reduction in width of the rear portion facilitates assembly operations and makes it possible to keep the diameter of the lubricant housing 8 substantially the same as or even smaller than that of the front portion of the device.

The plane projection shown in Figure 17 illustrates the outside of the thread-carrying portion of the device. Since the observer is considered to be looking down upon the figure it is impossible to represent the vertical thread-lifting and thread-depositing movements of the blades otherwise than by means of legends, and these are placed at the left. The lateral protrusion and recession components of the blade movements incident to their four-bar linkage mounting are indicated by the numerals 45 to 51, inclusive. This figure also indicates the zone of thread advance which, in the embodiment shown, it will be observed, embraces five of the eight blades. The amount of this advancement of the thread, that is, the distance that it is shifted after being lifted from the thread support surfaces 19 of ribs 17 by the blades and deposited by them in advanced position on said support members, is also indicated in the figure at the right thereof.

Figure 18 shows this thread advancement on an exaggerated scale as a function of the eccentric movement, the latter being represented by the circle at the bottom and the dotted lines 53 to 56, the arrow 57 indicating the direction of rotation of the eccentric and hence also the movement of any given point on the blade. In other words, each point on each blade will have an orbital eccentric movement corresponding to a given movement of the eccentrics that drive the blade and it is this movement that lifts, carries and deposits the thread. These movements of the various blades are so timed in sequential relation as hereinbefore explained and as shown graphically in Figure 17, as to produce a helical wrapping of the thread on the device and this wrapping is produced in the form of a helical unit which, once formed, remains constant in extent, and occupies a fixed position on the device although treated thread issues therefrom as fast as freshly created thread is supplied to it. The device is "self-threading." To start producing the helical wrapping of the thread it is merely necessary for the operator to "slap" the wet end of the thread coming from the coagulating bath against the surface of the device near the driven end thereof while the latter is rotating. The wet thread adheres sufficiently to the surface of the blade 8 or support member 17 (whichever it may strike) to permit it to be carried along to form the helical unit, thus obviating the necessity of wrapping or stringing the device by hand. When the helically wrapped unit is formed, the thread begins to issue at the other end whereupon the operator leads the free end as it issues from the device and attaches it to a reel, spool, cone or other storage device 6 (Figure 1), after which the creation, treatment and storage of the thread proceeds without interruption until a fresh storage device has to be substituted.

What is claimed is:

1. A device for use in the continuous method of producing synthetic thread and adapted for wrapping thread in the form of helical convolutions for transient repose thereon to permit treatment thereof, including a stationary shaft, an openwork frame arranged to rotate on said shaft and comprising spaced plates rigidly connected by members radial to said shaft, pinions rigidly mounted on said shaft, pinions rotatably carried by said plate-connecting members and meshing at right angles with the pinions on said shaft, thread advancing blades eccentrically pivoted on said rotatable pinions, the rotation of the frame causing the rotatable pinions to travel around the pinions on the shaft and impart a pivotal four-bar linkage type of motion to the blades, another frame being provided integral with said first frame and rotating bodily therewith but overhanging said shaft in cantilever fashion said second frame having spaced bar-like segments protruding outwardly therefrom, said blades also extending outwardly to the same extent as said segments and parallel therewith in thread depositing relation to said segments.

2. A device for use in the continuous method of producing synthetic thread and adapted for wrapping thread in the form of helical convolutions for transient repose thereon to permit treatment thereof including a stationary shaft, a structure comprising a forward cylindrical thread-treating component and a rear cylindrical driving component, a space between both components, the rear component being mounted on said shaft for rotation of the whole device but leaving the forward component wholly unobstructed and protruding in cantilever fashion from said shaft both components including a plurality of bar-like members extending longitudinally of the axis of the device and radially with respect to the axis thereof, at least a pair of gears rigidly fixed on said shaft, a pair of gears rotatably carried by each of the bar-like radial members of the rear component and meshing with those on the shaft, thread-advancing blades carried eccentrically by each of said pairs of gears in pivotal four-bar linkage fashion, said blades extending from the rear component into the forward component in cantilever fashion and freely parallel to and adjacent the protruding bars of the forward component so that when the device is rotated as a whole the gears carried by the radial members of the rear component will travel around the gears on the shaft and also rotate on their own axes and impart a four-bar linkage motion to the blades eccentrically carried by them, the eccentric pivotal positions and movements of said blades being sequentially different and chosen so as to produce progression of the thread on the thread-carrying portion in the form of helical convolutions.

3. A device for use in the continuous method of producing synthetic thread and adapted for wrapping thread in the form of helical convolutions for transient repose thereon to permit treatment thereof including a stationary shaft, a structure comprising a forward cylindrical thread-treating component and a rear cylindrical driving component, a space between both components, the rear component being mounted on said shaft for rotation of the whole device but leaving the forward component wholly unobstructed and protruding in cantilever fashion from said shaft, both components including bar-like members extending longitudinally of the axis of the device and radially with respect to the axis, gears rigidly fixed on said shaft, gears rotatably carried by the bar-like members of the rear component and meshing with those on the shaft, thread-advancing blades carried eccentrically by said gears in pivotal four-bar linkage fashion, said blades extending from the rear component into the forward component in cantilever fashion and freely parallel to and adjacent the bars of the forward component so that when the device is rotated as a whole the gears carried by the members of the rear component will travel around the gears on the shaft and also rotate on their own axes and impart a pivotal four-bar linkage motion to the blades eccentrically carried by them.

4. In a thread treating reel including a driving end carried by a stationary shaft and a thread-carrying end extending out therefrom in cantilever fashion, a plurality of thread-advancing blades disposed radially about said driving end and having their thread-carrying portions extending out into the cantilever portion, radially disposed segmental members extending out from the cantilever portion and stationary with respect to said blades and cooperating therewith in thread-advancing relation, each blade being individually eccentrically pivoted at pivots transverse thereto at the driving end, means associated with said stationary shaft and said blades for imparting a four-bar linkage system movement to each of said blades for effecting advance and helical wrapping of the thread around the blades and cooperating segments at the cantilever end of the reel, the eccentric pivoting of the blades varying sequentially from blade to blade so as to effect said advancement and helical wrapping of said thread.

5. In a thread treating reel including a driving end carried by a stationary shaft and a thread-carrying end extending out therefrom in cantilever fashion, a plurality of thread-advancing blades disposed radially about said driving end and having their thread-carrying portions extending out into the cantilever portion, radially disposed segmental members extending out from the cantilever portion and stationary with respect to said blades and cooperating therewith in thread-advancing relation, at least one pair of gears fixed to said stationary shaft, an equal number of gears for each blade meshing therewith and disposed in the driving end for travel about the said fixed gears and for rotation on their own axes, said blades being carried in eccentrically pivoted fashion by said second set of gears for imparting a four-bar linkage system movement to each of said blades when the blade-carrying gears travel around the gears rigidly fixed to the stationary shaft, the eccentric pivoting of the blades to the second set of gears varying sequentially from blade to blade to as to effect advancement of the thread and its wrapping in helical convolution form at the cantilever end of the reel.

6. In a thread treating reel including a driving end carried by a stationary shaft and a thread-carrying end extending out therefrom in cantilever fashion, a plurality of thread-advancing blades disposed radially about said driving end and having their thread-carrying portions extending out into the cantilever portion, radially disposed segmental members extending out from the cantilever portion and stationary with respect to said blades and cooperating therewith in thread-advancing relation, at least one pair of gears fixed to said stationary shaft, an equal number of gears for each blade meshing therewith and disposed in the driving end for travel about the said fixed gears and for rotation on their own axes, said blades being carried in eccentrically pivoted fashion by said second set of gears for imparting a four-bar linkage system movement to each of said blades when the blade-carrying gears travel around the gears rigidly fixed to the stationary shaft, the eccentric pivoting of the blades to the second set of gears varying sequentially from blade to blade so as to effect advancement of the thread and its wrapping in helical convolution form at the cantilever end of the reel, the driving end constituting one component of the reel and the cantilever end another component, said components being spaced from each other, flexible sealing means being provided on each blade at the places where the blades pass from one component to the other to prevent entry of treating liquid into the driving end.

7. In a thread treating reel including a driving end carried by a stationary shaft and a thread-carrying end extending out therefrom in cantilever fashion, a plurality of thread-advancing blades disposed radially about said driving end and having their thread-carrying portions extending out into the cantilever portion, radially disposed segmental members extending out from the cantilever portion and stationary with respect to said blades and cooperating therewith in thread-advancing relation, at least one pair of gears fixed to said stationary shaft, an equal number of gears for each blade meshing therewith and disposed in the driving end for travel about the said fixed gears and for rotation on their own axes, said blades being carried in eccentrically pivoted fashion by said second set of gears for imparting a four-bar linkage system movement to each of said blades when the blade-carrying gears travel around the gears rigidly fixed to the stationary shaft, the eccentric pivoting of the blades to the second set of gears varying sequentially from blade to blade so as to effect advancement of the thread and its wrapping in helical convolution form at the cantilever end of the reel, the driving end constituting one component of the reel and the cantilever end another component, said components being spaced from each other, flexible sealing means being provided on each blade at the places where the blades pass from one component to the other to prevent entry of treating liquid into the driving end, said flexible sealing means being in the form of bellows attached to each blade and to the end of the drive component where the blades emerge to enter the cantilever component.

8. A device for use in the continuous method of producing synthetic thread and adapted for wrapping thread in the form of helical convolutions for transient repose thereon to permit treatment thereof comprising a rotary cylindrical structure provided with elements about its circumference for lifting and advancing the thread and with stationary elements cooperating therewith for supporting the thread, the thread-advancing elements each being constituted as pivoted members of individual four-bar linkage systems pivoted at points transverse thereto and the thread-supporting members being stationary relatively thereto, the said thread lifting and advancing elements being individually moved in such related sequence as to effect wrapping of the thread in spaced helical convolutions on said device as the latter is rotated.

9. A device for use in the continuous method of producing synthetic thread and adapted for wrapping thread in the form of convolutions for transient repose thereon to permit treatment thereof comprising a rotary structure provided with elements for lifting and advancing the thread and with stationary elements cooperating therewith for supporting the thread, the thread-advancing elements each being constituted as pivoted members of individual four-bar linkage systems pivoted at points transverse thereto and the thread-supporting members being stationary relatively thereto, the said thread lifting and advancing elements being individually moved in such related sequence as to effect wrapping of the thread in spaced convolutions on said device and a common drive means for driving all of the individual thread-advancing elements.

10. A device for use in the continuous method of producing synthetic thread and adapted for wrapping thread in the form of helical convolutions for transient repose thereon to permit treatment thereof comprising a rotary cylindrical structure provided with elements about its circumference for lifting and advancing the thread and with stationary elements cooperating therewith for supporting the thread, the thread-advancing elements each being constituted as pivoted members of individual four-bar linkage systems pivoted at points transverse thereto and the thread-supporting members being stationary relatively thereto, the said thread lifting and advancing elements being individually moved in such related sequence as to effect wrapping of the thread in spaced helical convolutions on said device as the latter is rotated, and a common drive means for driving all of the individual thread-advancing elements.

11. In a thread treating reel including a driving end carried by a stationary shaft and a thread-carrying end extending out therefrom in cantilever fashion, a plurality of thread-advancing blades disposed radially about said driving end and having their thread-carrying portions extending out into the cantilever portion, radially disposed segmental members extending out from the cantilever portion and stationary with respect to said blades and cooperating therewith in thread-advancing relation, each blade being individually eccentrically pivoted at points transverse thereto at the driving end, means associated with said stationary shaft and said blades for imparting a four-bar linkage system movement to each of said blades for effecting advance and helical wrapping of the thread around the blades and cooperating segments at the cantilever end of the reel.

CARL F. GRAM.